United States Patent [19]

Ohishi et al.

[11] Patent Number: 4,861,860
[45] Date of Patent: Aug. 29, 1989

[54] PROCESS FOR PRODUCING POLYESTER

[75] Inventors: Kohji Ohishi, Shizuoka; Minoru Akiyama, Fuji; Ryuichi Sekita, Numatsu, all of Japan

[73] Assignee: Polyplastics Co., Ltd., Japan

[21] Appl. No.: 266,941

[22] Filed: Nov. 3, 1988

[30] Foreign Application Priority Data

Dec. 7, 1987 [JP] Japan .................. 62-309216

[51] Int. Cl.$^4$ .............................. C08G 63/22
[52] U.S. Cl. .................... 528/272; 528/302; 528/308; 528/308.3; 528/308.7; 528/480; 526/88
[58] Field of Search ........... 528/272, 302, 308, 308.3, 528/308.7, 480; 526/88

[56] References Cited

U.S. PATENT DOCUMENTS

| | | | |
|---|---|---|---|
| 3,925,329 | 12/1975 | Heinrich et al. | 526/88 |
| 3,987,021 | 10/1976 | Rothert | 526/88 |
| 4,107,409 | 8/1978 | Szabolcs et al. | 526/65 |
| 4,299,935 | 11/1981 | Chatelain | 526/88 |
| 4,657,871 | 4/1987 | Freakley et al. | 436/55 |

Primary Examiner—John Kight
Assistant Examiner—S. A. Acquah
Attorney, Agent, or Firm—Nixon & Vanderhye

[57] ABSTRACT

A polyester having a high quality is produced by stirring its polycondensation reaction mixture in such a way that the stirring rate is reduced continuously in a stepwise manner corresponding to an increase in the melt viscosity as the reaction proceeds so that the stirring load is substantially constant after the viscosity of the reaction system has reached an arbitrary value between 20 and 800 P until the completion of the reaction.

3 Claims, 2 Drawing Sheets

PROCESS FOR PRODUCING POLYESTER

FIELD OF THE INVENTION

The present invention relates to a process for producing polyesters. In particular, the present invention relates to a process for producing high-quality polyesters in an economical manner by conducting polycondensation in a molten state under efficient stirring conditions.

BACKGROUND AND SUMMARY OF THE INVENTION

Thermoplastic polyester resins are produced by subjecting a dicarboxylic acid component (including an ester-forming derivative thereof; the same shall apply hereinafter) and a dihydroxy compound component (including an ester-forming derivative thereof; the same shall apply hereinafter); a hydroxy carboxylic acid compound component (including an ester-forming derivative thereof; the same shall apply hereinafter); or all of these three components to an esterification or transesterification reaction to form a polyester precursor and then polycondensing the precursor. In the polycondensation step, the polyester precursor is heated by stirring under reduced pressure. Excessive monomer(s) and by-products are removed from the reaction system. So that the polycondensation reaction may proceed. Therefore, it is quite important to remove these substances quite efficiently and thus reduce the necessary reaction time to produce the polymer product in an economically advantageous manner or to obtain a stable high-quality polymer. Particularly the manner of stirring is important, since it exerts a significant influence on the efficiency of degasification and removal of these substances.

Known stirring processes in the polycondensation step include, for example, a process wherein the stirring is conducted at a constant rotational speed and a process wherein the rotational speed is lowered stepwise as the viscosity of the reaction mixture is increased with the progress of polycondensation. However, in the polycondensation step, the viscosity of the reaction mixture is continuously increased as the reaction proceeds and the viscosity becomes extremely high particularly immediately before the completion of the reaction. Such a change in the viscosity makes efficient stirring difficult.

When the rated output of the stirring motor is constant in the former process, the following phenomenon occurs: when the rotational speed is fixed on a high level suitable for a low-viscosity region in the initial stage of the reaction as shown in FIG. 4, it cannot adapt itself to the stirring in a high-viscosity region in the latter half of the reaction and, therefore, the stirring motor is stopped by the overload. When, on the contrary, the rotational speed is fixed on a low level suitable for the high viscosity in the latter half of the reaction, the stirring in the initial stage of the reaction is quite inefficient as shown in FIG. 3.

In the latter process wherein the rotational speed is lowered stepwise (usually in 2 to 5 steps) as the viscosity of the reaction mixture is increased as shown in FIG. 2, efficient stirring is possible. However, immediately after the rotational speed is lowered, a superfluous allowance over the rated output occurs and the efficiency of degasification and removal of the excess monomers, etc. will be insufficient.

Thus, in the known stirring processes, the stirring efficiency is poor and, therefore, degasification of the excess monomer(s), etc. is insufficient. Thus, problems occur such as reduced polymerization rates prolonged, reaction times reduced degrees of polymerization and inconsistent polymer quality.

The present invention relates to a process for producing a polyester comprising as the main structural unit(s) any of the following components (1) to (3):
(1) a dicarboxylic acid residue and a dihydroxy compound residue,
(2) a hydroxy carboxylic acid compound residue, and
(3) a dicarboxylic acid residue, a dihydroxy compound residue and a hydroxy carboxylic acid compound residue, by a polycondensation reaction in a molten state under stirring, characterized in that the polycondensation is conducted while the stirring rate is reduced continuously in a stepless manner corresponding to an increase in the melt viscosity as the reaction proceeds so that the stirring load is substantially constant after the viscosity of the reaction mixture has reached an arbitrary value between 20 and 800 P until the completion of the reaction.

BRIEF DESCRIPTION OF THE ACCOMPANYING DRAWINGS

FIG. 1 is a graph showing changes in the viscosity of a reaction mixture, rotational stirring speed, and load versus reaction time when the stirring speed is controlled according to the present invention; and FIG. 2 is a graph showing a prior art technique of lowering rotational stirring speed in a stepwise manner; and FIGS. 3–4 are each graphs showing prior art techniques employing constant rotational stirring speeds.

DETAILED DESCRIPTION OF THE INVENTION

Figure 1:
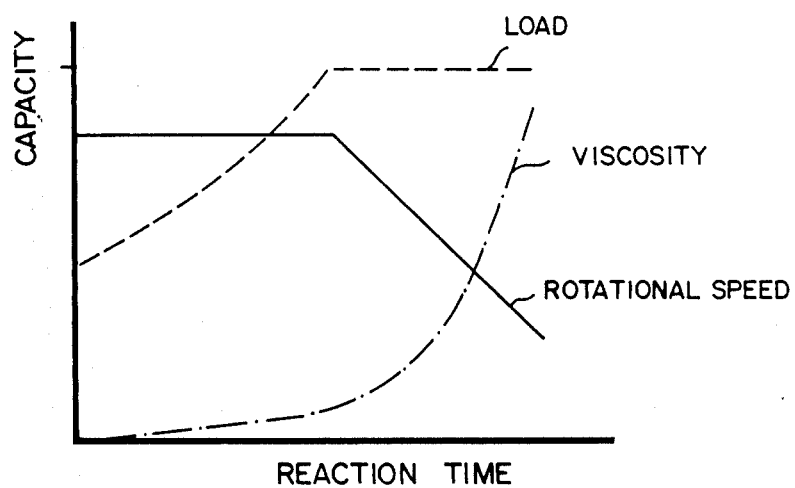

The polyesters produced by the process of the present invention include those comprising as the main structural units a dicarboxylic acid residue and a dihydroxy compound residue, those comprising as the main structural unit a hydroxy carboxylic acid compound residue and those comprising as the main structural units all of these three residues. Both homopolyesters and copolyesters can be produced by the process of the present invention.

The starting monomers for the dicarboxylic acid residues which are structural units of the polyesters include known dicarboxylic acids such as terephthalic, isophthalic, naphthalenedicarboxylic, diphenyldicarboxylic, diphenyl ether dicarboxylic, diphenylethanedicarboxylic, cyclohexanedicarboxylic, adipic and sebacic acids which may be substituted with an alkyl or alkoxy group or a halogen. These dicarboxylic acids may be used also in the form of an ester-forming derivative thereof such as a lower alcohol ester, e.g. dimethyl ester, thereof. These compounds may be used either singly or in combination of two or more of them in the present invention.

The starting monomers for the dihydroxy compound residues include dihydroxy compounds such as ethylene glycol, propylene glycol, butanediol, butenediol, neopentyl glycol, hydroquinone, resorcinol, dihydroxyphenyl, naphthalenediol, dihydroxydiphenyl ether, cyclohexanediol, 2,2'-bis(4-hydroxyphenyl)propane, polyalkylene glycol, polyoxyalkylene glycol and polyoxybutenediol which may be substituted with an alkyl or alkoxy group or a halogen. Ester-forming derivatives of these compounds are also usable. These compounds may be used either singly or in combination of two or more of them in the present invention.

The starting monomers of the hydroxy carboxylic acid compound residues include hydroxy carboxylic acids such as hydroxybenzoic, hydroxynaphthoic and diphenyleneoxycarboxylic acids which may be substituted with an alkyl or alkoxy group or a halogen. Further ester-forming derivatives of them are also usable. These compounds may be used either singly or in combination of two or more of them in the present invention.

The polyesters produced by the process of the present invention may contain another compound residue which modifies the polyesters. These compounds include, for example, polyfunctional compounds such as trimellitic acid, pyromellitic acid, trimethylolpropane, glycerol and pentaerythritol, oligoamides and oligocarbonates.

The process of the present invention can be employed for the production of all of the thermoplastic polyesters by the polycondensation of the above-described monomeric compounds. The effect of this process is remarkable particularly in the production of polybutylene terephthalate comprising as the main structural units terephthalic acid residue and 1,4-butanediol residue.

In the production of the polyester from the above-described compound(s) in the present invention, a polyester precursor is produced by a transesterification reaction, an esterification reaction or the like and then the precursor is polycondensed to give the polymer.

The process of the present invention for producing the polyester is characterized by the manner of stirring the reaction mixture in the polycondensation step.

Namely, the present invention is characterized in that the rotational speed of the stirrer is lowered continuously in a stepless manner corresponding to an increase in the viscosity of the reaction mixture as the polycondensation reaction proceeds from a specified stage of the polymerization until the completion of the reaction.

The stirring motor must have a rated output sufficient for stirring the reaction mixture having a high viscosity immediately before the completion of the reaction. It is preferred that the stirring is conducted substantially constantly with a tolerable maximum capacity of the motor while the rotational speed is lowered continuously in a stepless manner.

The process of the present invention will be illustrated with reference to the attached drawings.

FIG. 1 is a simplified graph showing the effect of the present invention obtained by controlling the stirring, wherein the abscissae are the reaction time and the ordinates are the stirring rotational speed, the load and the viscosity of the reaction liquid.

Figure 2:
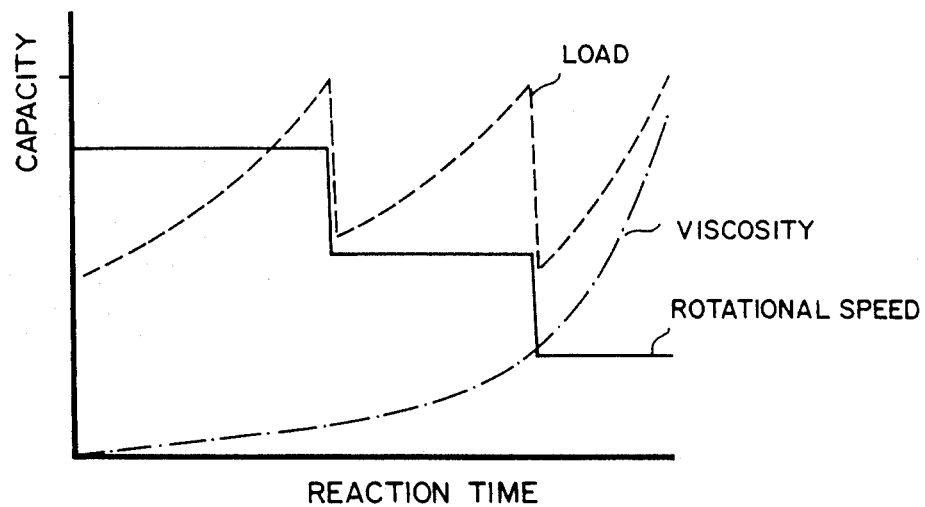
Figure 3:
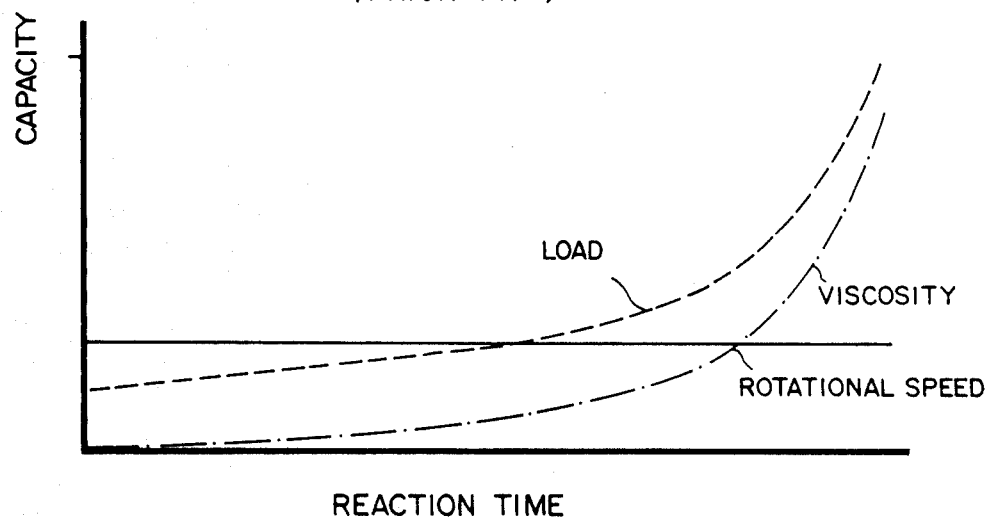
Figure 4:
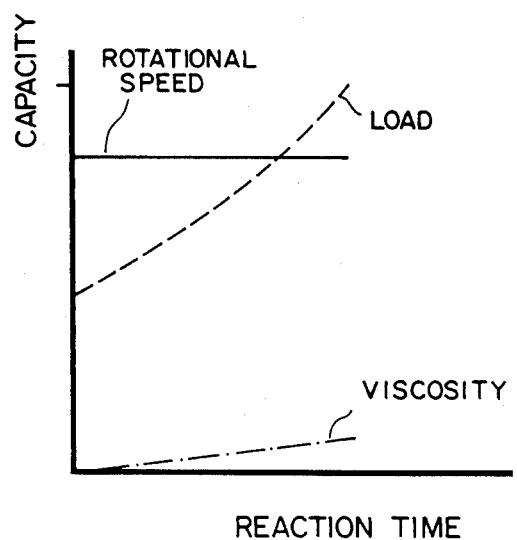

FIGS. 2 to 4 show the results obtained by the stepwise lowering of the rotational speed (two steps in FIG. 2) and those obtained at a constant rotational speed by conventional processes. It is apparent from these figures that when the stirring is conducted at a constant rotational speed, the stirring efficiency is quite low in the initial and middle stages of the reaction (when the rotational speed is low) as shown in FIG. 3 or the stirring becomes impossible in the last stage of the reaction (when the rotational speed is high) as shown in FIG. 4.

In an improved conventional process wherein the rotational speed is lowered stepwise, the load is reduced immediately after lowering the rotational speed to give a superfluous allowance of the motor capacity. Such a stirring process is quite inefficient.

Thus, the stirring efficiency of the known conventional stirring process is poor and, therefore, the degasification and removal of the excess monomers are insufficient, the polymerization reaction rate for forming the polyester is low and a long reaction time is taken for obtaining the polymer having an intended degree of polymerization.

On the contrary, in the present invention, the rotational speed, i.e. stirring rate, is lowered continuously in a stepless manner so that the load is made substantially constant from a specified stage of the polymerization until the completion of the reaction. By this process, constant, suitable stirring can be conducted corresponding to the increase in the viscosity of the reaction mixture and the degasification and removal of excess monomer(s), etc. can be conducted efficiently. As a result, the reaction rate is increased, the reaction time is reduced and the high-quality polymer is obtained.

The stirring load is made constant (namely the rotational speed is continuously changed) when the viscosity of the reaction system (viscosity of the reaction mixture at the reaction temperature) has reached 20 to 800 P. The timing can be determined suitably within this range depending on the capacity of the stirring motor, size and shape of the reaction vessel, and quantity and properties of the reaction mixture.

The stirring speed must be inevitably extremely high in order to maintain the stirring load constant in the initial stage of the polycondensation reaction, because the reaction mixture in this stage has a viscosity as low as less than 20 P. However, even when the stirring rotational speed is made excessively high, no significant effect of improving the reaction rate can be obtained and rather the liquid is scattered by the high speed rotation and entrainment of the liquid tends to occur due to the distillation of a large quantity of low-boiling substances in the initial stage of the reaction. It is thus preferred that the rotational speed is adjusted to one which does not cause these problems, for example, about 20 to 200 rpm in the initial stage of the reaction and then the output is made constant after the rotational speed has reached the tolerable capacity of the motor as the reaction proceeds and the viscosity of the reaction mixture is increased.

When the stirring load in the operation is made constant after the viscosity of the reaction system has exceeded 800 P, the effect of the present invention thus obtained is only slight, because the viscosity is increased abruptly from this point of time until the completion of the reaction, the time taken for the reaction is only short and the period of time in which the efficient stirring is conducted is only short. Therefore, it is essential to start the constant load operation at an arbitrary point of time at which the viscosity of the reaction system is between 20 to 800 P, preferably 25 to 500 P and more preferably 30 to 300 P. By the process of the present invention, the efficient stirring is conducted over a sufficient time to efficiently remove the unreacted monomer(s) and impurities (by-products) without causing the entrainment. As a result, the reaction rate is increased. The process is thus quite effective for the purposes of the present invention, i.e. reduction in the reaction time and stable production of high-quality polyesters.

The apparatus for conducting the process of the present invention must be such that the stirring speed is variable. They include, for example, an apparatus having an inverter motor and that having a means capable of continuously changing the reduction gear ratio. Among them, the apparatus having the inverter motor is preferred from the viewpoints of the cost and size of the apparatus.

Another means of controlling the stirring speed is a control loop in which the electric power loaded on the stirring motor is monitored and interlocked with the rotation so that the rotational speed is automatically changed to keep the electric power load value constant.

The catalysts used in the process of the present invention for producing the polyesters are known ones such as inorganic acid salts, organic acid salts, hydroxides, oxides and alkoxides of metals of groups II-a and II-b, e.g. calcium, magnesium, zinc and cadmium and metals of groups IV-a, IV-b and v-b, e.g. titanium, germanium, tin, lead, antimony and manganese.

In the process of the present invention for producing the polyesters, additives, for example, phosphorus compounds such as phosphoric acid, phosphoric esters, phosphorous acid, phosphorous esters and phosphonites, phenolic antioxidants and amine compounds can be added to the reaction mixture at an arbitrary time from the charge of the starting monomers until the completion of the polycondensation reaction. Such an additive is often useful for inhibiting the reduction in the molecular weight due to the thermal decomposition of the polyester to thereby conduct the polymerization reaction stably in the course of the production of the polyester or for improving the stability to heat, oxygen, light, etc. during the processing or use after the production of the polyester. These compounds are particularly preferably added in the course of the polycondensation reaction.

According to the process of the present invention for producing polyesters by polycondensation wherein the polycondensation is conducted while the stirring speed is lowered continuously in the stepless manner corresponding to the increase in the viscosity of the reaction mixture in order to keep the stirring load constant at least from a middle stage of the polymerization until the completion of the reaction, the surface of the reaction mixture can be renewed sufficiently and excess monomer(s), etc. can be removed efficiently, because the stirring is conducted always in the preferred manner. As a result, the degree of polymerization is increased, the reaction time can be reduced, the quality of the polymer can be improved and the recovery rate of the unreacted monomer(s) can be increased. This process is thus economically quite preferred.

[EXAMPLES]

The following Examples will further illustrate the present invention, which by no means limit the invention.

EXAMPLE 1

A mixture of 1,000 parts by weight of dimethyl terephthalate, 600 parts by weight of 1,4-butanediol and 0.63 part by weight of tetrabutyl titanate was placed in a reactor after purging with nitrogen. It was heated to elevate the temperature from 135° C. to 190° C. in 110 min under stirring at 120 rpm to conduct transesterification. Methanol thus formed was distilled off.

The pressure in the reactor was reduced to 2 Torr and the temperature was elevated to 250° C. to conduct polycondensation while excess 1,4-butanediol was distilled off. An inverter motor was used for the stirring in the course of the polycondensation. The stirring speed was fixed at 33 rpm in the initial stage of the polycondensation in which the viscosity of the reaction mixture was low as shown in FIG. 1. After the viscosity of the reaction mixture was increased and the output of the motor reached the rated value (the viscosity was about 200 P in this stage) as the polycondensation proceeded, the polycondensation was continued while the rated output was kept constant, namely while the stirring rotational speed was lowered in a stepless manner corresponding to the viscosity of the reaction mixture increasing with the progress of the polycondensation. When the rotational speed reached 11 rpm (viscosity: about 2,000 P), the reaction was terminated. The time taken for the polycondensation after the transesterification reaction was 140 min. The polybutylene terephthalate thus obtained had an intrinsic viscosity of 0.86 as determined in o-chlorophenol at 25° C. The standard deviation thereof (o) was 0.005.

The loss in the removal of excess 1,4-butanediol was 12.6%.

COMPARATIVE EXAMPLE 1

The transesterification reaction was conducted in the same manner as that of Example 1 and then the polycondensation was conducted in the same manner as that of Example 1 except that only the stirring conditions were altered to prepare a polybutylene terephthalate. An ordinary motor having the same rated output as that of Example 1 was used for the stirring in the polycondensation step. As shown in FIG. 2, the stirring speed was 33 rpm in the initial stage of the polycondensation in which the viscosity of the reaction mixture was low. As the viscosity of the reaction mixture was increased to the rated output of the motor as the polycondensation proceeded, the rotational speed was lowered each time by 22 rpm (viscosity: about 200 P) and 11 rpm (viscosity: about 640 P). When the rotational speed reached the rated output at 11 rpm (viscosity: about 2,000 P), the reaction was terminated. The time taken in the polycondensation in this process was 180 min. The polymer thus obtained had an intrinsic viscosity of 0.86 and the standard deviation thereof (o) was 0.009.

The loss in the removal of excess 1,4-butanediol was 15.2%.

We claim:

1. A process for producing a polyester comprising as the main structural unit any of the following components (1) to (3):
   (1) a dicarboxylic acid residue and a dihydroxy compound residue,
   (2) a hydroxy carboxylic acid compound residue, and
   (3) a dicarboxylic acid residue, a dihydroxy compound residue and a hydroxy carboxylic acid compound residue,
by conducting a polycondensation reaction in its molten state while stirring it in such a way that the stirring rate is reduced continuously in a stepless manner corresponding to an increase in the melt viscosity as the reaction proceeds so that the stirring load is substantially constant after the viscosity of the reaction system has reached an arbitrary value between 20 and 800 P until the completion of the reaction.

2. A process for producing a polyester according to claim 1, wherein the polyester is polybutylene terephthalate comprising a dicarboxylic acid residue and a dihydroxy compound residue as the main structural units, the dicarboxylic acid residue mainly comprises a terephthalic acid residue and the dihydroxy compound residue mainly comprises a 1,4-butanediol residue.

3. A process for producing a polyester according to claim 1 or 2, wherein an inverter motor is used for stirring to keep the stirring load substantially constant.

* * * * *

UNITED STATES PATENT AND TRADEMARK OFFICE
CERTIFICATE OF CORRECTION

PATENT NO. : 4,861,860

DATED : August 29, 1989

INVENTOR(S) : OHISHI et al

It is certified that error appears in the above-identified patent and that said Letters Patent is hereby corrected as shown below:

Column 1, line 26, after "system" delete the period (.) and insert a comma (,); change "So" to --so--;
   line 49, after "fixed", delete "on" and insert --at--;
   line 55, after "fixed" delete "on" and insert --at--.

Column 2, line 2, after "rates" insert a comma (,) and after "prolonged" delete the comma (,);
   line 3, after "times" insert a comma (,).

Column 4, line 7, delete "taken for obtaining the" and insert --required to obtain a--;
   line 20, delete "the" and insert --a--;
   line 32, after "has a" insert --low-- and after "viscosity delete "as low" and insert --of--;
   line 33, before "less" delete "as";
   line 61, after "causing" delete "the" and insert --their--.

UNITED STATES PATENT AND TRADEMARK OFFICE
CERTIFICATE OF CORRECTION

PATENT NO. : 4,861,860

DATED : August 29, 1989

INVENTOR(S) : OHISHI et al

Page 2 of 2

It is certified that error appears in the above-identified patent and that said Letters Patent is hereby corrected as shown below:

Column 5, line 3, after "them," delete "the" and insert --an--; and after "having" delete "the" and insert --an--;
        line 29, after "the" delete "stability to";
        line 30, after "etc." insert --stability of the polyester--;after "during" delete "the" and after "or" insert --during--;
        line 38, after "mixture" insert a comma (,);
        line 43, change "conducted always" to --always conducted-- and after "in" delete "the" and insert --a--.
        / line 15,
Column 6, after "thereof" change "(o)" to --($\Gamma$)--;
        line 38, after "thereof" change "(o)" to --($\Gamma$)--.

Signed and Sealed this

Second Day of October, 1990

Attest:

HARRY F. MANBECK, JR.

*Attesting Officer*      *Commissioner of Patents and Trademarks*